United States Patent
Yamasaki (10) Patent No.: US 9,545,093 B2
(45) Date of Patent: Jan. 17, 2017

(54) ANIMAL TRAP

(71) Applicant: Shuichi Yamasaki, Osaka-shi, Osaka (JP)

(72) Inventor: Shuichi Yamasaki, Osaka-shi, Osaka (JP)

( * ) Notice: Subject to any disclaimer, the term of this patent is extended or adjusted under 35 U.S.C. 154(b) by 71 days.

(21) Appl. No.: 14/527,303

(22) Filed: Oct. 29, 2014

(65) Prior Publication Data

US 2016/0029614 A1   Feb. 4, 2016

(30) Foreign Application Priority Data

Nov. 26, 2013   (JP) ................... 2013-243874

(51) Int. Cl.
*A01M 23/00*   (2006.01)
*A01M 23/06*   (2006.01)

(52) U.S. Cl.
CPC ..................... *A01M 23/06* (2013.01)

(58) Field of Classification Search
CPC .............. A01M 23/06; A01M 23/08
USPC ................... 43/69, 64, 65, 66, 67
See application file for complete search history.

(56) References Cited

U.S. PATENT DOCUMENTS

| | | | | |
|---|---|---|---|---|
| 4,103,448 A * | 8/1978 | Souza | ................... | A01M 23/08 43/58 |
| 6,691,452 B1 * | 2/2004 | Knuppel | ............... | A01M 23/04 43/64 |
| 2002/0066222 A1 * | 6/2002 | Gehret | ................... | A01M 23/04 43/61 |
| 2004/0025410 A1 * | 2/2004 | Shapland | ............. | A01M 23/12 43/65 |
| 2009/0229169 A1 * | 9/2009 | Weisberg | ............. | A01M 23/08 43/65 |
| 2010/0257772 A1 * | 10/2010 | Uhlik | ................... | A01M 23/12 43/61 |
| 2013/0312312 A1 * | 11/2013 | Coito | ................... | A01M 23/18 43/61 |

FOREIGN PATENT DOCUMENTS

| | | | | |
|---|---|---|---|---|
| GB | 2293956 A | * | 4/1996 | ............ A01M 23/06 |
| JP | S61-260872 A | | 11/1986 | |
| JP | 3113786 U9 | | 8/2005 | |

* cited by examiner

*Primary Examiner* — Joanne Silbermann
(74) *Attorney, Agent, or Firm* — Wood, Phillips, Katz, Clark & Mortimer (57) ABSTRACT

An animal trap for capturing a small-weight animal. The animal trap includes a capturing enclosure 12 provided with a first entrance 11, a swing plate 13, provided in an approach 15 of an animal entered from the first entrance 11, for plugging up the first entrance 11 by swinging forward, and a locking mechanism 14 for temporarily locking the swing plate 13 so that the swing plate 13 swung to plug up the first entrance 11 does not swing back. The temporary locking mechanism 14 includes a first lock part 21A and a second lock part 21B that are disposed in a front end part of the swing plate 13. The lock parts are constructed to have mutually different heights at which the swing plate 13 is temporarily locked. When an animal enters, the swing plate 13 swings to plug up the first entrance 11, and it is temporarily locked. The swing plate 13 can be swung by a small weight.

2 Claims, 7 Drawing Sheets

ANIMAL TRAP

TECHNICAL FIELD

The present disclosure relates to an animal trap used in order to capture animals, such as rats and raccoons.

BACKGROUND ART

Conventionally, as trapping apparatuses for capturing animals, such as rats and raccoons, trapping apparatuses utilizing a seesaw plate as illustrated, for example, in the following Patent Documents 1 and 2, are provided. Note that the reference numerals in brackets used in the following description are the same as those published in the official gazettes.

REFERENCE DOCUMENTS OF CONVENTIONAL ART

Patent Document 1: Japanese Utility Model Registration No. 3113786U

Patent Document 2: Japanese Unexamined Patent Application Publication No. S61-260827A

DISCLOSURE OF REFERENCE DOCUMENTS

In a noxious insect and harmful animal trapping box disclosed in Patent Document 1, a deeper part of a seesaw (3) descends by its own weight when a rat enters therein from an entrance and moves deeper than the center of the seesaw (3). Then, since a rotation shaft (7) thereof is offset downwardly, the seesaw (3) looses the balance, and the deeper side drops to the bottom without being stopped, and is secured by the attracting forces between a magnet (4) located underneath the seesaw (3) and a magnet (5) located at the box bottom. A rat cannot escape from the trapping box since the seesaw (3) plugs up the entrance in the above state.

In a rodent trap disclosed in Patent Document 2, when the rat enters from the entrance and moves deeper from the center of a ramp plate (93), the entrance is closed by the ramp plate (93). The ramp plate (93) is stopped by a capture plate (98) so that the ramp plate (93) cannot swing back from the above state. Therefore, the rat is prevented from escaping.

DISCLOSURE OF THE INVENTION

Problems to be Solved by the Invention

[Problem of Document 1]

The noxious insect and harmful animal trapping box of the Patent Document 1 is to operate the seesaw (3) greatly to capture a rat. With such a structure, the seesaw (3) cannot be operated greatly if the rat does not have a certain weight or heavier. Therefore, a small-weight animal cannot be captured.

Further, when the deeper part of the seesaw (3) drops without being stopped, the seesaw (3) is secured by the attracting forces of the magnets (4) and (5). At this time, a rear end of the seesaw (3) contacts a reversion prevention plate (6), and looses a clearance. For this reason, if the rat's tail is caught between the rear end of the seesaw (3) and the reversion prevention plate (6), the seesaw (3) will swing back without fully being secured. Therefore, the rat which entered and was captured with considerable efforts will escape.

Further, if one rat is captured, it cannot capture another rat even if other rats come. The maximum number of rats which can be captured by one trapping box is only one. Moreover, if the captured rat is surprised and acts violently, the magnets (4) and (5) may be separated to allow the only one rat captured with the considerable efforts to escape. After all, the capture results may become zero rats.

[Problem of Document 2]

The rodent trap of the Patent Document 2 is to operate the capture plate (98) and the ramp plate (93) to capture a rat. With such a structure, the capture plate (98) and the ramp plate (93) cannot be operated if the rat does not have a certain weight or heavier. Therefore, a small-weight animal cannot be captured.

The ramp plate (93) is configured to be stopped by the capture plate (98) from swinging back so that the rat is prevented from escaping. At this time, a lower end of the capture plate (98) is accommodated in a notch (97) to prevent the ramp plate (93) from swinging back. For this reason, if the rat's tail is caught between the ramp plate (93) and the box, the ramp plate (93) will swing back without fully being secured. Therefore, the rat which entered and was captured with considerable efforts may be allowed to escape.

Further, if one rat is captured, it cannot capture another rat even if other rats come. The maximum number of rats which can be captured by one trapping box is only one. Moreover, if the captured rat is surprised and acts violently, the ramp plate (93) may be released to allow the only one rat captured with considerable efforts to escape. After all, the capture results will be zero rats.

[Purpose of the Invention]

The present disclosure is made in view of the above situations, and the purpose of the present disclosure is as follows.

The present disclosure is to provide an animal trap, which, when a small-weight animal enters therein, can certainly operate to capture the small-weight animal, can capture an animal with a long tail without allowing the animal to escape, and can capture not only one animal, but also can continuously capture a second animal, a third animal and so on.

SUMMARY OF THE INVENTION

In one form, the animal trap includes a capturing enclosure provided with a first entrance, a swing plate, provided in an approach of an animal entered from the first entrance, for plugging up the first entrance by swinging forward in entering direction of the animal, and a temporary locking mechanism for temporarily locking the swing plate so that the swing plate swung in a state in which the swing plate plugs up the first entrance does not swing back. The temporary locking mechanism includes a first lock part and a second lock part that are disposed in a front end part of the swing plate. The first lock part and the second lock part are constructed to have mutually different temporary locking heights so that the swing plate does not swing back.

In one form, each of the first lock part and the second lock part may include a rotary member rotatably attached to a shaft traversing the entering direction. Each of the rotary members may include a laterally-oriented lock piece for temporarily locking the swing plate so that the lock piece engages with the front end part of the swing plate not to allow the swing plate to swing back, and a vertically-oriented release operation piece for rotating the rotary member when releasing the lock. The first lock part and the second lock part may be constructed to have mutually different heights of the lock pieces.

In one form, a second entrance, and a capturing chamber for capturing the animal entered from the second entrance may be provided forward of the first lock part and the second lock part. A stretcher board may be provided for releasing the temporary locking of the swing plate by operating the release operation pieces of the first lock part and the second lock part when the animal passes through the second entrance.

Effects of the Invention

In one form, when the animal which entered from the first entrance moves forward on the swing plate in the approach, the swing plate swings forward in the entering direction to plug up the first entrance. In this state, the swing plate is temporarily locked by the temporary locking mechanism so that the swing plate does not swing back. Thereby, the animal which entered from the first entrance cannot escape but is captured. Since the swing plate can swing by a small weight, the animal is certainly captured even if it is small in weight.

When the swing plate swings forward, the first lock is performed first by one of the first lock part and the second lock part which is higher in the locking height. When the swing plate further swings forward, the second lock which is lower in the locking height is then performed. In the state in which the first lock is performed, the clearance exists between the swing plate and the first entrance, and, even if the animal which entered has a long tail, the tail will not be pinched between the swing plate and the first entrance. Since the swing plate is locked in this state, the caught animal will not be allowed to escape.

In one form, when the swing plate swings forward, the front end part of the swing plate hits the lock piece to rotate the rotary member, and the front end part of the swing plate engages with the lock piece to temporarily lock the swing plate so that the swing plate does not swing back. When releasing the locking, the rotary member is rotated in the opposite direction by the release operation piece. Then, the first lock and the second lock are performed by the lock pieces which have mutually different heights. Thereby, even if the animal which entered has a long tail, the tail will not be pinched between the swing plate and the first entrance. In addition, the swing plate is locked in this state so that the caught animal will not be able to escape.

In one form, the animal which entered from the first entrance is captured by the temporary locking of the swing plate. When the animal enters into the capturing chamber from the second entrance, it passes through on the stretcher board. At this time, by the stretcher board, the release operation pieces of the first lock part and the second lock part are operated to release the temporary locking of the swing plate. Therefore, when the animal enters from the first entrance and is captured enters into the capturing chamber from the second entrance, the temporary locking of the swing plate is released to resume the swing plate back to a state in which it is again acceptable of another animal. Thereby, it can capture not only one animal but also can continuously capture a second animal, a third animal and so on.

MODES FOR CARRYING OUT THE INVENTION

Hereinafter, one embodiment of an animal trap according to the present disclosure is illustrated in detail.

FIGS. 1 to 8 are views illustrating an animal trap of this embodiment.

[Entire Structure]

Figure 1:
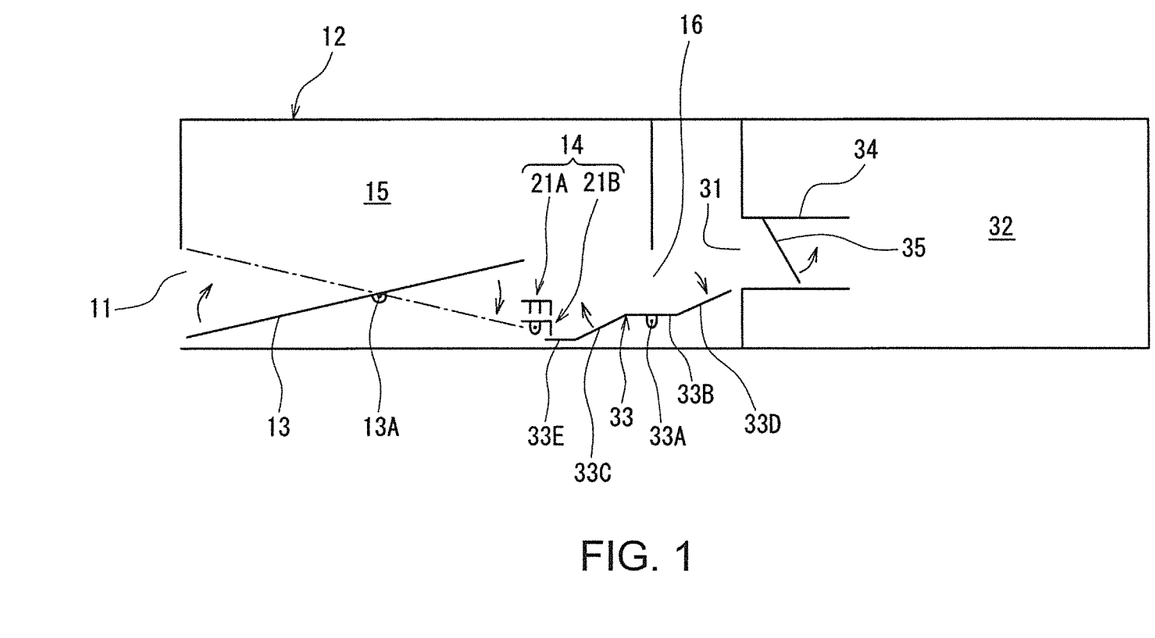
FIG. 1 is a cross-sectional view illustrating the entire structure of an animal trap according to one embodiment of the present disclosure.

FIG. 1 is a cross-sectional view illustrating the entire structure of the animal trap of this embodiment. This animal trap is provided with a first entrance 11 in a lower half part on the rear side of a capturing enclosure 12 formed in a rectangular parallelepiped shape extending in longitudinal directions of the animal trap. An animal subject to capture enters into the capturing enclosure 12 from the first entrance 11. The animal which entered from the first entrance 11 passes through an approach 15, a gate 16, and a second entrance 31, and then enters into a capturing chamber 32 to be captured.

This animal trap is provided with a swing plate 13 in the approach 15 of the animal which entered from the first entrance 11, which plugs up the first entrance 11 by swinging forward in an entering direction of the animal. The animal trap is also provided with a temporary locking mechanism 14, which temporarily locks the swing plate 13 so that that the swing plate 13 swung in a state in which it plugs up the first entrance 11 does not swing back. The animal trap is further provided with a stretcher board 33, which releases the temporary locking of the swing plate 13 by releasing the temporary locking mechanism 14 when the animal passes through the second entrance 31.

[Swing Plate]

Figure 2A:
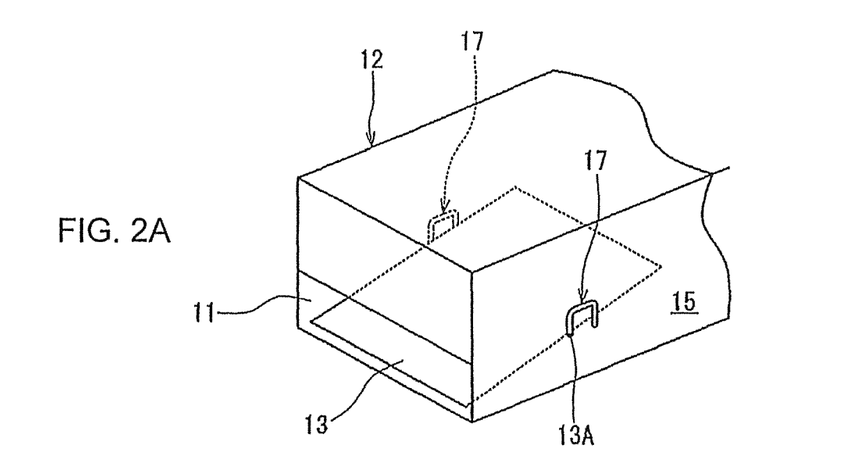
FIG. 2(A) is a perspective view of a swing plate and FIG. 2(B) is a cross-sectional view thereof.
Figure 2B:
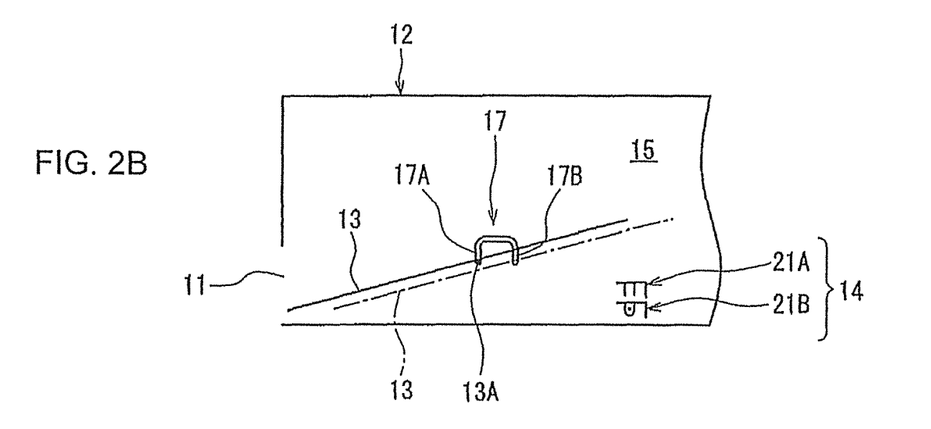

FIGS. 2(A) and 2(B) illustrate the swing plate 13, where FIG. 2(A) is a perspective view and FIG. 2(B) is a cross-sectional view.

The swing plate 13 is provided in the approach 15 of the animal which entered from the first entrance 11, and is pivotally supported in a seesaw manner by a shaft 13A which crosses the longitudinal directions which are the entering direction of the animal. In an initial state, the swing plate 13 is balanced so that a rear end part on the first entrance 11 side descends and forms an upward incline. Therefore, when the animal which entered from the first entrance 11 moves forward in the approach 15, the swing plate 13 swings so as to drop the front end part.

Thus, when the swing plate 13 swings forward in the entering direction of the animal to raise the rear end part and plugs up the first entrance 11. In this state, the animal which entered into the approach 15 cannot escape after the temporary locking mechanism 14 temporarily locks the swing plate 13 so that the swing plate 13 which swung in the state in which the first entrance 11 is plugged up does not swing back.

The shaft 13A which pivotally supports the swing plate 13 is supported at both ends by support slits 17 formed in both side walls of the capturing enclosure 12. The support slit 17 is a slit having a downwardly-opening C-shape, a first support portion 17A thereof is formed on the first entrance 11 side (rear side), and a second support portion 17B is formed on the front side. Therefore, the swing plate 13 is configured to be switchable in the pivotal support position between two locations of a first position where the shaft 13A is pivotally supported by the first support portion 17A and a second position where the shaft 13A is pivotally supported by the second support portion 17B. In FIG. 2(B), the swing plate 13 at the first position is illustrated by a solid line, and the swing plate 13 at the second position is illustrated by a broken chain line.

At the first position, the swing plate 13 is pivotally supported at a position near the first entrance 11 side, and, at the second position, the swing plate 13 is pivotally supported at a position distant from the first entrance 11 side with respect to the first position. When the swing plate 13 is pivotally supported at the first position, the front end part of the swing plate 13 is in a lock mode in which it can be temporarily locked by the temporary locking mechanism 14. On the other hand, when the swing plate 13 is pivotally supported at the second position, the temporary locking mechanism 14 is in a free mode in which it cannot lock the front end part of the swing plate 13.

Therefore, if the swing plate 13 is switched in the pivotal support position so that it is pivotally supported at the second position, an animal can move freely between the first entrance 11 and the approach 15. The animal trap is installed and left in this state for a while, an animal to be captured can get used to the movement of the animal trap and, thus, the animal can be easily captured alive after its cautiousness is reduced. Since the animal will be captured on the next day of setting to the lock mode, the captured animal will not be killed. The day to capture can be selected. Therefore, if capturing small animals, such as field rats, for the purpose of research or the like, the small animals can be captured alive and releasable afterwards. For animals which act in groups, since the groups gather by setting to the free mode and feeding them, it becomes easy to collectively capture them. It is also effective in extermination of nonnative animals.

[Temporary Locking Mechanism]

Figure 3:
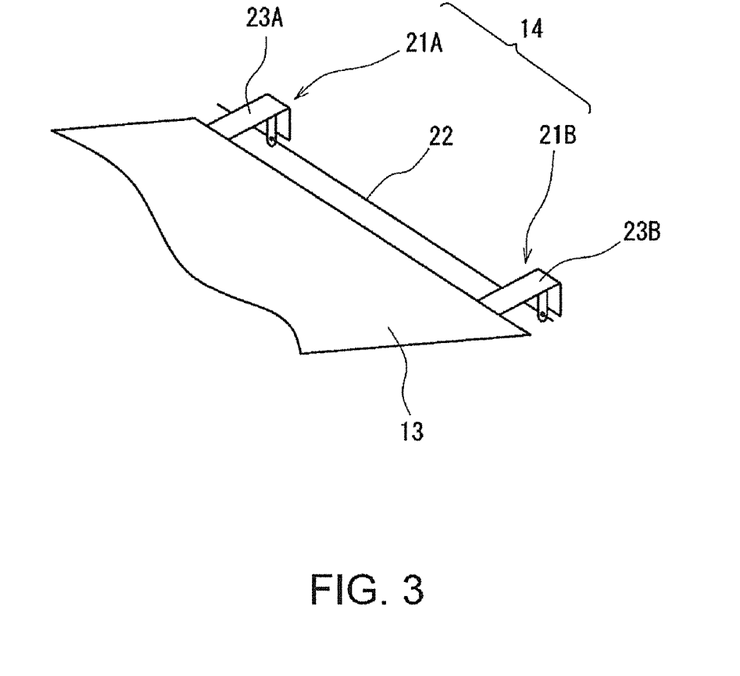
FIG. 3 is a perspective view illustrating a temporary locking mechanism.

FIG. 3 is a perspective view illustrating the temporary locking mechanism 14.

The temporary locking mechanism 14 is comprised of a first lock part 21A and a second lock part 21B which are disposed at the left and right of the front end part of the swing plate 13. The first lock part 21A and the second lock part 21B are constructed so that the heights of the temporary locking differ mutually so that the swing plate 13 does not swing back.

In this example, when the swing plate 13 swings forward from the initial state, the first lock part 21A operates first to temporarily lock the swing plate 13. This is a first temporary locked state. The second lock part 21B does not operate at this time. In this state, a slight clearance is created between the rear end part of the swing plate 13 and an opening upper edge part of the first entrance 11. Thus, when an animal with a long tail enters, the swing plate 13 is temporarily locked in a state in which the tail is protruded outside from the clearance.

Then, when the swing plate 13 further swings forward from the first temporary locked state, the second lock part 21B operates to temporarily lock the swing plate 13. This is a second temporary locked state. In this state, the clearance is not created between the rear end part of the swing plate 13 and the opening upper edge part of the first entrance 11. Thus, the entered animal cannot move backward.

Figure 4A:
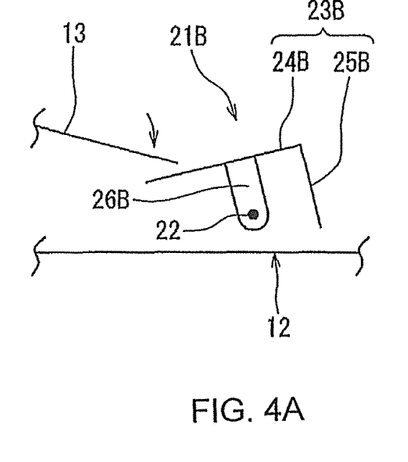
FIG. 4(A) illustrates the swing plate in an operating state and FIG. 4(B) illustrates the swing plate in a temporarily locked state.
Figure 4B:
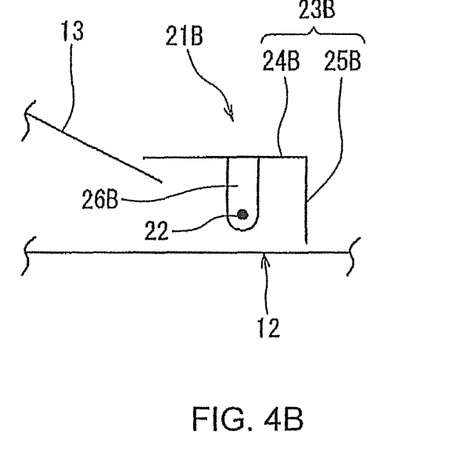

FIGS. 4(A) and 4(B) illustrate the temporary locking mechanism 14 for temporarily locking the swing plate 13, where FIG. 4(A) illustrates a state in which the swing plate 13 is operable and FIG. 4(B) is a state in which the swing plate 13 is locked. In the figures, although the structure and operation of the second lock part 21B are illustrated, the structure and operation of the first lock part 21A are similar.

The first lock part 21A and the second lock part 21B include a first rotary member 23A and a second rotary member 23B having an angle shape (an L-shape) rotatably attached to the shaft 22 which crosses the entering direction, respectively. The first rotary member 23A and the second rotary member 23B are pivotally supported by the common shaft 22.

The first rotary member 23A and the second rotary member 23B have, as one side of the L-shape, a first laterally-oriented lock piece 24A and a second laterally-oriented lock piece 24B, respectively, which engage with the front end part of the swing plate 13 and temporarily lock the swing plate 13 so that the swing plate 13 does not swing back. On the other hand, the other side of the L-shape is a first vertically-oriented release operation piece 25A and a second vertically-oriented release operation piece 25B, respectively, which, when the locking is released, rotate the first rotary member 23A and the second rotary member 23B, respectively.

The first rotary member 23A and the second rotary member 23B have a first pivotal support piece 26A and a second pivotal support piece 26B, which extend downwardly from the first lock piece 24A and the second lock piece 24B, respectively. The first rotary member 23A and the second rotary member 23B are pivotally supported by the shaft 22 near tip ends of the first pivotal support piece 26A and the second pivotal support piece 26B, respectively.

When the swing plate 13 swings forward, the front end part thereof hits rear sides of the upper surfaces of the first lock piece 24A and the second lock piece 24B to rotate the first rotary member 23A and the second rotary member 23B rearwardly. By this rotation, the front end part of the swing plate 13 turns around (passes through) the rear end parts of the first lock piece 24A and the second lock piece 24B, and is then located below the rear end parts. In this state, if the swing plate 13 is going to swing back, the front end part of the swing plate 13 is then caught by the first lock piece 24A and the second lock piece 24B. At this time, the first rotary member 23A and the second rotary member 23B will not rotate forward because the lower ends of the first release operation piece 25A and the second release operation piece 25B contact a floor surface of the capturing enclosure 12. Thereby, the swing plate 13 becomes in a temporary locked state.

Figure 5A:
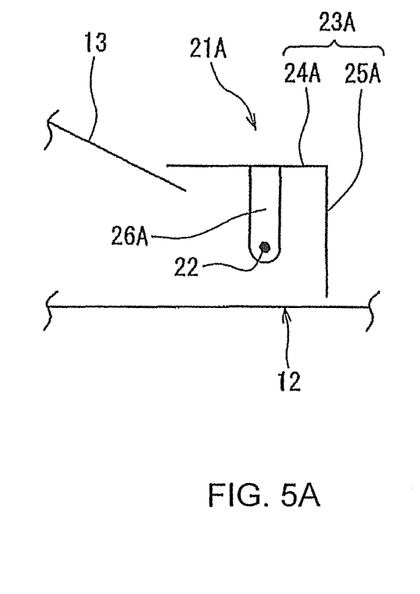
FIG. 5(A) is a view illustrating a first lock part and FIG. 5(B) is a view illustrating a second lock part.
Figure 5B:
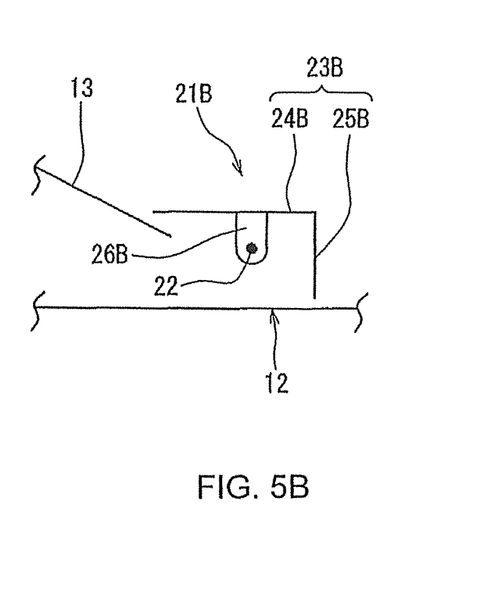

FIGS. 5(A) and 5(B) illustrate temporary locking heights that differ mutually, where FIG. 5(A) illustrates the first lock part 21A and FIG. 5(B) illustrates the second lock part 21B.

The first lock part 21A and the second lock part 21B are constructed so that the heights of the first lock piece 24A and the second lock piece 24B differ mutually. In this example, the first lock part 21A and the second lock part 21B are designed so that the first pivotal support piece 26A of the first lock part 21A is longer than the second pivotal support piece 26B of the second lock part 21B. That is, the height of the first lock piece 24A is higher than the height of the second lock piece 24B. Thereby, the first lock part 21A and the second lock part 21B are configured so that the temporary locking heights differ mutually without allowing the swing plate 13 to swing back.

[Stretcher Board]

Figure 6:
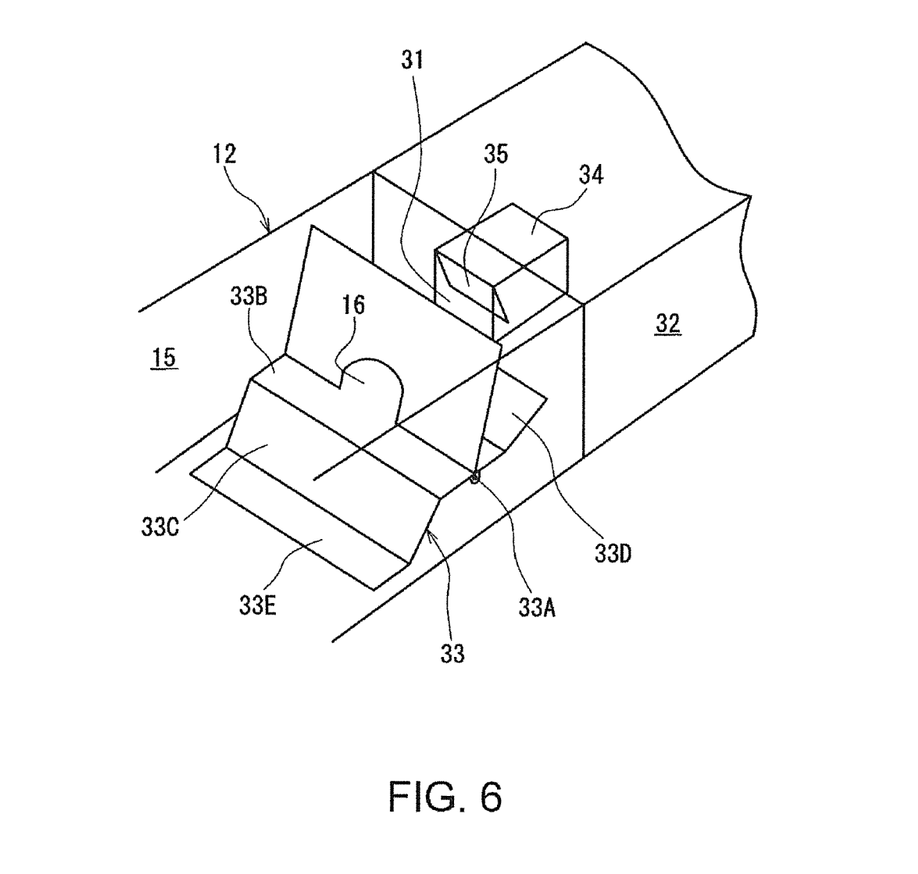
FIG. 6 is a view illustrating a peripheral structure of a stretcher board.

FIG. 6 is a view illustrating a peripheral structure of the stretcher board 33.

The stretcher board 33 is disposed between the second entrance 31 to the capturing chamber 32, and the approach 15. The stretcher board 33 is pivotally supported in a seesaw manner by a shaft 33A which crosses the entering direction. The stretcher board 33 is provided with a first ramp plate 33C and a second ramp plate 33D respectively at rear and front of a pivotal support plate 33B which is supported by the shaft 33A. Further, an operating plate 33E which releases the first release operation piece 25A and the second release operation piece 25B of the first lock part 21A and the second lock part 21B is provided to the first entrance 11 side of the first ramp plate 33C.

The operating plate 33E is disposed below lower ends of the first release operation piece 25A and the second release operation piece 25B of the first lock part 21A and the second lock part 21B.

The second entrance 31, and the capturing chamber 32 where an animal which entered from the second entrance 31 is captured are provided forward of the first lock part 21A and the second lock part 21B.

A gate 16 where the animal which moved forward through the approach 15 passes through is formed on the pivotal support plate 33B. It is constructed so that the animal passed through the gate 16 enters into the capturing chamber 32 from the second entrance 31. The second entrance 31 is connected with a tunnel part 34 provided inside the capturing chamber 32. A one-way door 35 is provided inside the tunnel part 34, which only opens inwardly of the capturing chamber 32 and does not open outwardly.

Figure 7A:
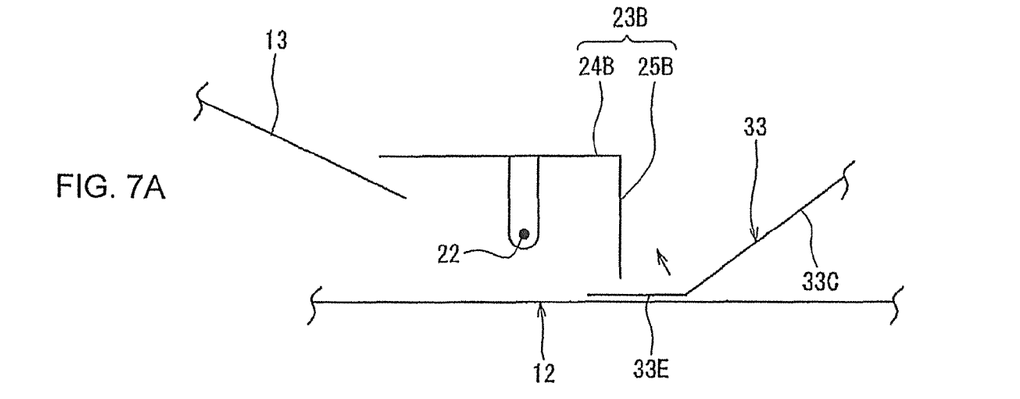
FIG. 7(A) illustrates the stretcher board before operation and FIG. 7(B) illustrates the stretcher board once operated.
Figure 7B:
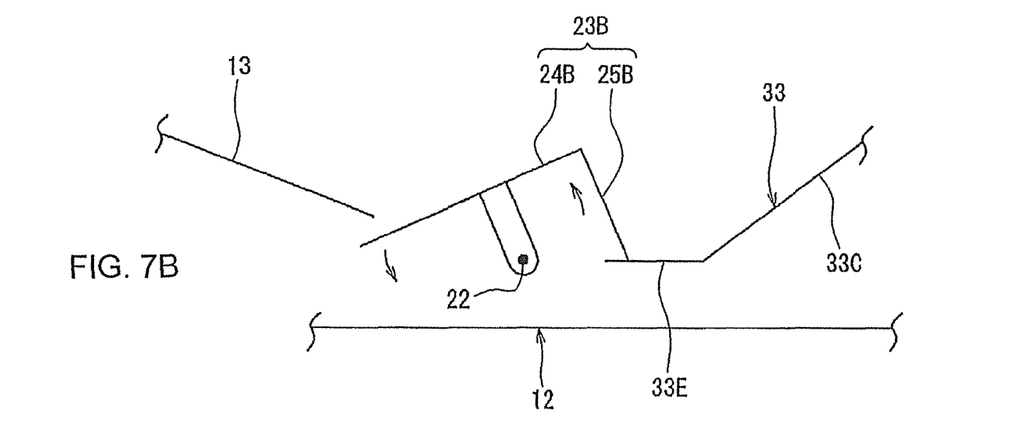

FIG. 7(A) illustrates a state before the stretcher board is operated, and FIG. 7(B) illustrates a state in which the stretcher board is operated.

According to the structure described above, when an animal which entered into the first entrance 11 moves forward in the approach 15, passes through on the stretcher board 33, moves under the gate 16, and passes through the second entrance 31, the stretcher board 33 then swings to lower a front part thereof, while raising the operating plate 33E. At this time, the stretcher board 33 respectively operates the first release operation piece 25A and the second release operation piece 25B of the first lock part 21A and the second lock part 21B, and releases the temporary locking of the swing plate 13.

That is, when the operating plate 33E of the stretcher board 33 is raised, it hits lower ends of the first release operation piece 25A and the second release operation piece 25B of the first lock part 21A and the second lock part 21B, and pushes up the release operation pieces 25A and 25B from below to rotate the first rotary member 23A and the second rotary member 23B rearwardly. By the forcible rotation of the first rotary member 23A and the second rotary member 23B, the first lock piece 24A and the second lock piece 24B turn around (pass through) the rear end part of the swing plate 13, and are then located below the swing plate 13. In this state, the temporary locked state of the swing plate 13 is released, and the swing plate 13 again swings back to the initial inclined state.

[Second Example of Temporary Locking Mechanism]

Figure 8A:
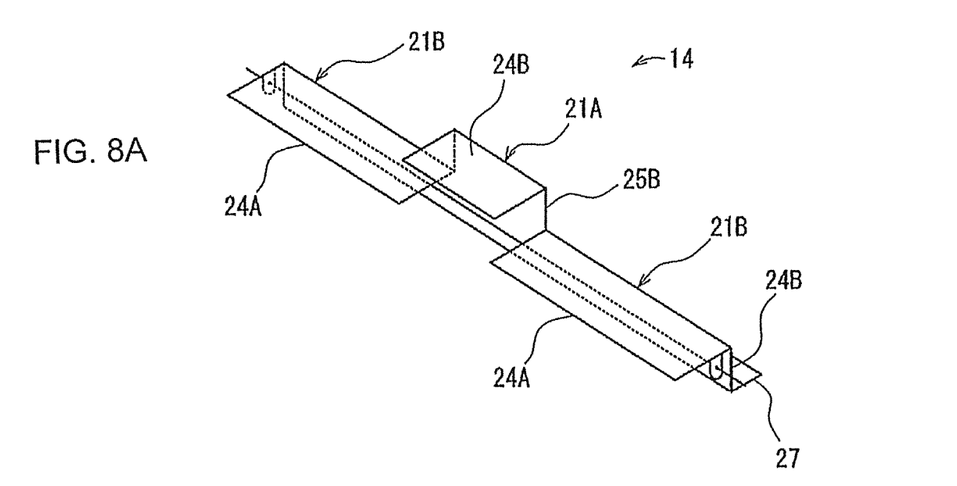
FIG. 8(A) is a perspective view of the temporary locking mechanism and FIG. 8(B) is a side view.
Figure 8B:
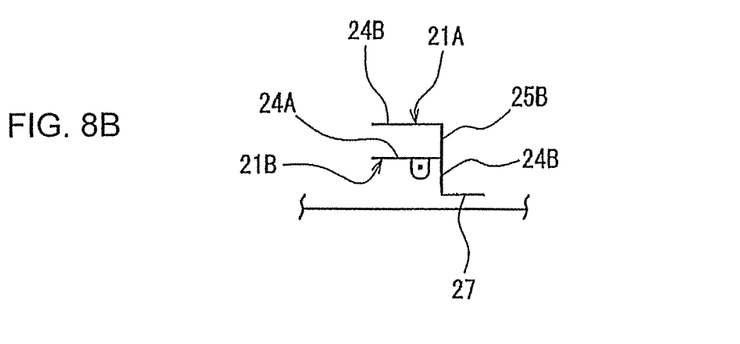

FIGS. 8(A) and 8(B) illustrate a second example of the temporary locking mechanism 14. In this example, the first lock part 21A is disposed at the center, and the second lock parts 21B are disposed on both sides of the first lock part 21A. The first lock part 21A is higher in the height at which it temporarily locks the swing plate 13 than the second lock part 21B. That is, the first lock piece 24A is disposed higher than the second lock piece 24B. Further, the first release operation piece 25A and the second release operation pieces 25B are integrally formed. A balance piece 27 which serves as a weight which maintains the balance is laterally formed in lower ends of the first release operation piece 25A and the second release operation pieces 25B.

[Functions and Effects]

According to the animal trap of the embodiment, the following functions and effects can be obtained.

When an animal which entered from the first entrance 11 moves forward on the swing plate 13 in the approach 15, the swing plate 13 swings forward in the entering direction to plug up the first entrance 11. In this state, the swing plate 13 is temporarily locked by the temporary locking mechanism 14 so that the swing plate 13 does not swing back. Thereby, the animal which entered from the first entrance 11 cannot escape therefrom and, thus, the animal is captured. Since the swing plate 13 can swing by a small weight, the animal can be certainly captured even if it is small in weight.

When the swing plate 13 swings forward, the first lock is performed first by one of the first lock part 21A and the second lock part 21B which has a higher locking height. When the swing plate 13 further swings forward, the second lock is performed by the other one with a lower locking height. In the state in which the first lock is performed, the clearance exists between the swing plate 13 and the first entrance 11 and, thus, even if the animal which entered has a long tail, the tail will not be pinched between the swing plate and the first entrance 11. Since the swing plate 13 is locked in this state, the caught animal will not be able to escape.

When the swing plate 13 swings forward, the front end part of the swing plate 13 hits the first lock piece 24A and the second lock piece 24B to rotate the first rotary member 23A and the second rotary member 23B, the front end part of the swing plate 13 engages with the first lock piece 24A and the second lock piece 24B to temporarily lock the swing plate 13 so that the swing plate 13 does not swing back. When releasing the locking, the first rotary member 23A and the second rotary member 23B are rotated in the opposite direction by the first release operation piece 25A and the second release operation piece 25B. Then, the first lock and the second lock are performed by the first lock piece 24A and the second lock piece 24B which mutually differ in height. Thus, even if the animal which entered has a long tail, the tail will not be pinched between the swing plate 13 and the first entrance 11, and the caught animal will not be able to escape because the swing plate 13 is locked in that state.

The animal which entered from the first entrance 11 is captured by the temporary locking of the swing plate 13. When the animal enters into the capturing chamber 32 from the second entrance 31, it passes through on the stretcher board 33. At this time, by the stretcher board 33, the first release operation piece 25A and the second release operation piece 25B of the first lock part 21A and the second lock part 21B are operated to release the temporary locking of the swing plate 13. Therefore, when the animal which entered from the first entrance 11 and was captured enters into the capturing chamber 32 from the second entrance 31, the temporary locking of the swing plate 13 is then released and it resumes a state in which entering of another animal is acceptable. Thereby, it can capture not only one animal, but also can continuously capture a second animal, a third animal and so on.

OTHER MODIFICATIONS

As described above, although an especially-desirable embodiment of the present disclosure is illustrated, the present disclosure does not intend to be limited to the illustrated embodiment, but can be implemented while being modified into various kinds of modes, and, therefore, the present disclosure encompasses the various kinds of modifications.

DESCRIPTION OF REFERENCE NUMERALS

11: First Entrance
12: Capturing Enclosure
13: Swing Plate
13A: Shaft
14: Temporary Locking Mechanism
15: Approach
16: Gate
17: Support Slit
17A: First Support Portion
17B: Second Support Portion
21A: First Lock Part
21B: Second Lock Part
22: Shaft
23A: First Rotary Member
23B: Second Rotary Member
24A: First Lock Piece
24B: Second Lock Piece
25A: First Release Operation Piece
25B: Second Release Operation Piece
26A: First Pivotal Support Piece
26B: Second Pivotal Support Piece
27: Balance Piece
31: Second Entrance
32: Capturing Chamber
33: Stretcher Board
33A: Shaft
33B: Pivotal Support Plate
33C: First Ramp Plate
33D: Second Ramp Plate
33E: Operating Plate
34: Tunnel Part
35: One-Way Door

What is claimed is:

1. An animal trap, comprising:
a capturing enclosure provided with a first entrance;
a swing plate, provided in an approach of an animal entered from the first entrance, for plugging up the first entrance by swinging forward in entering direction of the animal; and
a temporary locking mechanism for temporarily locking the swing plate so that the swing plate swung in a state in which the swing plate plugs up the first entrance does not swing back,
wherein the temporary locking mechanism includes a first lock part and a second lock part that are disposed in a front end part of the swing plate,
wherein the first lock part and the second lock part are constructed to have mutually different temporary locking heights so that the swing plate does not swing back,
wherein the first lock part and the second lock part each includes a rotary member rotatably attached to a shaft traversing the entering direction,
each of the rotary members including:
a laterally-oriented lock piece for temporarily locking the swing plate so that the lock piece engages with the front end part of the swing plate not to allow the swing plate to swing back; and
a vertically-oriented release operation piece for rotating the rotary member when releasing the locking, and
wherein the first lock part and the second lock part are constructed to have mutually different heights of the lock pieces.

2. The animal trap of claim 1, wherein a second entrance, and a capturing chamber for capturing the animal entered from the second entrance are provided forward of the first lock part and the second lock part, and
wherein a stretcher board is provided for releasing the temporary locking of the swing plate by operating the release operation pieces of the first lock part and the second lock part when the animal passes through the second entrance.

* * * * *